United States Patent [19]

Bertram

[11] 4,069,735
[45] Jan. 24, 1978

[54] MUSIC TEACHING AND COMPUTATION DEVICE

[76] Inventor: Howard William Bertram, 55 Kingsway, Toronto, Canada

[21] Appl. No.: 651,367

[22] Filed: Jan. 22, 1976

[30] Foreign Application Priority Data

Jan. 27, 1975 United Kingdom ............... 3449/75

[51] Int. Cl.² ........................................... G09B 15/02
[52] U.S. Cl. ................................................... 84/474
[58] Field of Search ................... 84/471 SR, 473, 474

[56] References Cited

U.S. PATENT DOCUMENTS

| | | | |
|---|---|---|---|
| 10,217 | 11/1853 | Tillman | 84/474 |
| 148,097 | 3/1874 | Tillman | 84/474 |
| 3,572,205 | 3/1971 | Scholfield | 84/474 |
| 3,592,099 | 7/1971 | Gibby | 84/473 |
| 3,671,661 | 6/1972 | Yoshida | 84/473 |

Primary Examiner—Lawrence R. Franklin
Attorney, Agent, or Firm—Hirons & Rogers

[57] ABSTRACT

A music teaching and computation device in the form of a slide rule has a first display part on which are set out, by means of indicia the characteristic structures of five different modes of music. A second relatively movable display part co-operating with the first display part has indicia thereon representing notes of a musical keyboard, separated by spatial intervals in proportion to the musical intervals of pitch between the notes represented thereby. The first and second indicia can be brought into registry with each other, so as to compute the chords and scales in any of the presented given modes of music.

5 Claims, 5 Drawing Figures

MUSIC TEACHING AND COMPUTATION DEVICE

FIELD OF THE INVENTION

This invention relates to devices for assisting in musical composition, and for assisting in the study and learning of music principles and harmony.

In the teaching of music, and at least at the elementary level, it is normal to instruct the pupil to learn the notes of a key-board by letter and to locate the representation of the respective notes as musical notations on the familiar pair of five lined staffs. By this means, the pupil learns to play the key-board, normally of a piano, by reading the music written down in conventional manner and transposing written notes to the correct notes of the keyboard. Conventional written musical notations include symbols denoting key, key signatures, sharps, flats, note durations etc. In such teaching, little attention is paid to the inherent structure of music, the various modes of music or the relationship of the notes making up a mode of music to each other. The pupil therefore tends to learn to play music as written, but not to play "by ear", i.e. by location of the notes of melodies and harmonies on an instrument by recognition of sounds and patterns, without use of written notations of the music.

BACKGROUND OF THE INVENTION

There are a number of different modes of music, each of which comprises a series of diatonic scales. Each diatonic scale comprises a series of seven steps, rising from one tone to its octave. The steps between the degrees (notes) of a scale are either a semitone or a tone in magnitude. Each of the different modes of music has its own characteristic sequence of tone and semitone steps or intervals between successive degrees of its scales. All of the diatonic scales of a given mode of music have the tone-semitone sequence characteristic of that mode.

The most familiar modes of music in Western culture are the major scale (also known as the Ionian Mode), and the Aeolian or minor mode (from which Western minor scales are derived). The major mode has the following sequence of steps:

tone-tone-semitone-tone-tone-tone-semitone

Thus in a major scale which starts and finishes on the note C (i.e. in which C is the tonic or keynote), known as the scale (key) of C major, the degrees which must comprise the scale are dictated by the above interval sequence, and are as follows:

| | tone | tone | semitone | tone | tone | tone | semitone | |
|---|---|---|---|---|---|---|---|---|
| C— tonic | D— | E— | | F— | G— | A— | B— | C— tonic |

If D is chosen as the tonic note, the resulting scale of D major uses F sharp as the third note or degree instead of F natural and C sharp as the seventh note or degree instead of C natural, thereby maintaining the characteristic tone-semitone interval sequence of the major mode.

Other modes of music have different sequences of tone-semitone intervals between adjacent degrees of their diatonic scales. A thorough familiarity with the sequences characteristic of various modes of music facilitates playing by ear.

In the past, musical compositions in the Western culture have generally been written and played in accordance with one mode of music, at least for long passages of the composition. Any change from one mode, e.g. major, to another mode, e.g. Aeolian has normally represented a distinct transition point in the music, between separate passages thereof, except for occasional use of chords from another mode. It is seldom that more than two different modes of music are incorporated into the same composition.

There is currently, however, more and more attention being paid by composers and musicians alike to other modes of music, in addition to the familiar major and Aeolian minor modes, in particular the Phrygian mode, the Mixolydian mode and the Dorian mode. Numerous other modes of music are known, but the other modes do not fit the accepted harmonic patterns of music found in the Western culture. Up until fairly recently, the aforementioned modes have been regarded as archaic musical forms, and have not had a significant role in Western Culture. However, as composers and musicians continually strive for new and varied effects in their music, these previously disregarded modes are being used to a greater extent. There is also a tendency, in modern music, to "mix" the various modes of music in a single composition, and to make frequent and abrupt changes from one mode to another in the composition. One way of achieving this is to introduce into a musical passage written in a given mode, one or more chords which are derived from another mode. These chords thereby provide transition points for changing from one mode of music to another.

Accordingly, for the student of music, as well as for the composer, there is an increasing need to study and understand at least the five different modes of music referred to above, namely major (Ionian), Aeolian, Mixolydian, Dorian and Phrygian, and their relationship with one another. It is also helpful to know the various chords and characteristics thereof which can be used in different modes of music.

BRIEF DESCRIPTION OF THE PRIOR ART

There have been previous proposals for display devices for teaching various aspects of musical theory and structure. However, none of these display devices, as far as is known, have paid attention to the various different modes of music and the relationship between them. Further, they have not attempted to assist the music student or composer in understanding and working in all these various modes and in transposing music between the various modes Ionian (major), Aeolian, Dorian, Phrygian and Mixolydian.

SUMMARY OF THE INVENTION

The present invention provides a teaching device for use by a music student which assists the student in learning to play music by ear, by emphasising and exhibiting inherent musical patterns and forms, and by displaying graphically musical patterns and forms of a variety of different modes of music. Preferred embodiments of the invention also provide for the teaching of harmonics, and chords, and the computation thereof, in a variety of different modes of music, and can be used to assist in musical composition.

According to the present invention, there is provided a music teaching and computation device in the form of a slide rule. The device has a first relatively movable display part and a second relatively movable display part, each of which bear respective indicia. The first relatively movable display part is divided into at least three sectors, each sector representing a given, different mode of music, and each sector bearing a first series of indicia representing the notes of diatonic scales of the mode of music represented thereon, the indicia of the first series being spaced from one another a first distance representative of a musical interval of pitch of a tone or a second distance, substantially half the first distance, and representative of a musical interval of pitch of a semitone the sequence of first distances and second distances between adjacent notes corresponding to the tone-semitone sequence characteristic of the mode of music represented thereby;

the second relatively movable display part bearing a second series of indicia representing in sequence the notes of a musical keyboard, the distances between adjacent indicia of the second series being proportional to the musical interval of pitch between the notes represented by the respective indicia, the distance representing a musical interval of one tone in the second series of indicia being substantially the same as the distance representing a musical interval of one tone in the first series of indicia, the first and second relatively movable display parts being movable with respect to one another to allow the first and second series of indicia to be moved into registry with one another.

By suitable adjustment of the first and second display parts relative to each other, the first and second series of indicia can be registered with one another to allow the determination from their alignment of all the notes or degrees comprising a given diatonic scale, in any of modes of music presented by the sectors in the first display part. For example when the first and second series of indicia are aligned so that the indicia representing the note C of the second series of indicia coincides with the indicia of the first series representing the first note of a diatonic scale, the notes comprising the diatonic scales of C in all of the modes of music presented can be read off, by reading the coincidences of the indicia of the first series with the indicia of the second series, through all the sectors of the first display part.

DESCRIPTION OF THE PREFERRED EMBODIMENTS

Preferably, the first display part has at least four sectors, and most preferably five sectors, representing respectively the major (Ionian), Dorian, Phrygian, Mixolydian and Aeolian modes of music.

In a preferred embodiment of the invention, there are also provided third and fourth relatively movable display parts, bearing respectively third and fourth series of indicia, both the third and fourth series of indicia being essentially similar to the second series of indicia, and representing in sequence the notes of a musical keyboard, the distances between adjacent indicia of the respective third and fourth series being proportional to the musical interval of pitch between the notes represented by the respective indicia of the series, the distance representing a musical interval of one tone in the third and in the fourth series of indicia being substantially the same as the distance representing a musical interval of one tone in the first series of indicia. This preferred embodiment of the invention permits the construction of triad chords, in all of the various modes of music represented by respective sectors of the first display part.

An integral part of any musical composition is the triad chords present in the composition, which are largely responsible for conferring melodic and harmonic characteristics to the composition. A triad chord consists of three notes, comprised of alternate notes of the diatonic scale of the composition within its particular mode of music. The chord is generally referred to by its base note, i.e. the lowest note of the triad of which it is comprised. The chords of the C-major diatonic scale are thus CEG(first), DFA(second), EGB(third), FAC(fourth), GBD(fifth), ACE(sixth), and BDF(seventh chord).

Such a triad chord may be a major chord, a minor chord or a diminished chord. The type of chord is determined by the interval of pitch between the adjacent notes making up the triad chord. Since triad chords use notes found in a diatonic scale in a mode of music, the intervals of pitch between the notes of the chord, and hence their type as regards major, minor and diminished, is determined firstly by the mode of music under consideration and secondly by the base note of the chord. For example, in the case of the diatonic scale of C in the major mode, the first chord is CEG, and the intervals between the notes are respectively C-E two tones and E-G one and a half tones, which are characteristic intervals of a major chord. This is the C-major chord.

The second chord of the diatonic scale of C in the major mode, DFA, however, has corresponding intervals of one and a half tones (D-F) and two tones (F-A) which are the characteristic intervals of minor chords. This is the D minor chord. The seventh chord of the diatonic scale of C in the major mode BDF, has corresponding intervals of one and a half tones and one and a half tones, characteristic of a diminished chord. This chord BDF is thus called the B diminished chord.

Each note of a diatonic scale within a given mode of music can thus be assigned a designation major, minor or diminished, which denotes the character of the triad chord within the mode of music which uses the note as the base note. Since the character of the triad chord indicates its type of structured sound and harmony, a familiarity with the character of chords derived from a given base note in a particular mode of music is helpful in understanding musical structures, and making and understanding musical compositions and their melodic forms.

In the preferred form of the present invention, the first series of indicia on the first relatively movable display part include a further series of indicia which denotes the character of the triad chord which uses the note represented by the respective indicia as its base note. Such further indicia are included on the first series of indicia in all the sectors of the first display part, i.e. for all the modes of music represented thereon. Thus the device according to the invention permits not only the construction of triad chords in all the various modes of music represented thereon, but also a determination of their character, so as to assist in preparing musical compositions.

The device of the present invention permits the composer or student to move with ease between the various modes of music presented, and to recognize the relationships between them. Once the various display parts have been aligned to give information with respect to one mode of music, they are thereby aligned to give corresponding information with respect to all the other modes of music presented.

It has been discovered that, for any given diatonic scale of music, across all five of the different modes of music under consideration, there are nineteen possible chords (3 note triads) which can be used whilst maintaining the accepted melodic and harmonic characteristics of the music in the given diatonic scale. All of these nineteen chords can fit harmonically and melodically within the scheme of music of the given diatonic scale. Departure from these nineteen chords, in a composition in the given diatonic scale, gives a degree of dissonance. A composer generally selects the chords in his composition by ear, without being aware of the 19 possible chords open to him. The present invention provides a means of determining the 19 possible chords in any given diatonic scale and thus enlarges the scope of chord selection for the composer. Some of the chords of the nineteen possibilities are in one modality of music, whilst some are in another. The use of these chords, in a composition in a given diatonic scale, enables the composer to move between the different modalities of music within the composition, thereby increasing the range of melodic and harmonic characteristics of the composition.

Preferably, each of the display parts of the present invention is in the form of a disc, and the distances between indicia of a series are angular distances. The display parts are pivotally connected together at a common center, so that they overlie one another. The first display part is thus opaque, whilst the other display parts which overlie it may be transparent, with their respective indicia inscribed thereon.

In another embodiment of the invention, the first relatively movable display part is an opaque disc and bears the first indicia around its outer perimeter, and the second relatively movable display part is also an opaque disc, pivotally connected to the first part at a common center. The second disc is of smaller diameter than the first disc, so as to leave visible the first indicia when the second disc overlies the first disc. The second disc bears the second indicia around its periphery, for registration with the first indicia. The second disc, in this embodiment, may also bear, radially inwardly of the first indicia, notations of the notes comprising the triad chords of the respective base note indicated by the second indicia thereon. A third disc may be provided pivotally connected to the common center, and bearing the fourth-note indicia representing notes of a musical keyboard and angularly spaced from one another by an angular interval representing the appropriate musical tone or semitone interval. The third disc can be aligned so that the fourth note indicia thereon compute 4-note chords (6th or 7th) with the triad chord indicia on the second disc. Finally in this embodiment, there is provided a cover disc, fixed with respect to the first display part, generally opaque but provided with apertures therein which can be registered with the triad chord notations on the second display part. The apertures in the cover disc and the triad chord notations on the second disc may be presented in three circumferential sets in respective registration, the sets corresponding respectively to major, minor and diminished chords displayed on the thiad chord notations through the apertures when correctly aligned. Thus the character of a given triad chord may be indicated, according to the set of apertures through which it is displayed.

In a further alternative, the display parts can be made rectangular and relatively slidable with respect to one another, in the form of an elongated rectangular slide rule. In such form, the first relatively movable display part comprises the slide rule base, and the second, third and fourth display parts are slidably received in side-by-side relationship in a mounting recess in the first display part.

Other items of musical information may additionally be presented on the various display parts of the device according to the present invention. For example the first display part or first disc, may include fifth indicia comprising a series of equiangularly spaced notations, separated by an angular distance representing two and one half tones, and the second display part may include sixth indicia for registration with the fifth indicia, the sixth indicia representing notes of a musical keyboard and separated from one another by an angular distance representing the appropriate musical interval of a tone or a semitone. The notes represented by the sixth indicia in registry with the fifth indicia then progress in the clockwise direction by 4ths. and in the anti-clockwise direction by 5ths. Triad chords based upon notes separated by such 4th intervals and 5th intervals have harmonic relationship to one another and commonly follow one another, or progress harmonically into one another, in musical passages, in one specific mode of music, e.g. major(Ionian). Such fifth indicia in registry with sixth indicia also indicate to the composer or student major seventh chords which contain a common tritone, which is useful for the operator to know in understanding musical forms and compositions, and composing music. A major seventh is a four note chord comprising a major triad and the seventh of the scale.

Further, appropriate ones of fifth indicia may be joined together by suitable graphic means, to show the harmonic resolution of chords based on the note indicated by registry of the fifth and sixth indicia, into the prime chord of the tonic note under consideration.

The presently preferred embodiment of the invention is illustrated in the accompanying drawings, inwhich:

The illustrated embodiment of the invention comprises a plurality of indicia bearing display parts movable with respect to one another into various alignments and registrations with one another. The movable display parts are in the form of indicia bearing circular disc, pivotally connected at a common center.

Figure 1:
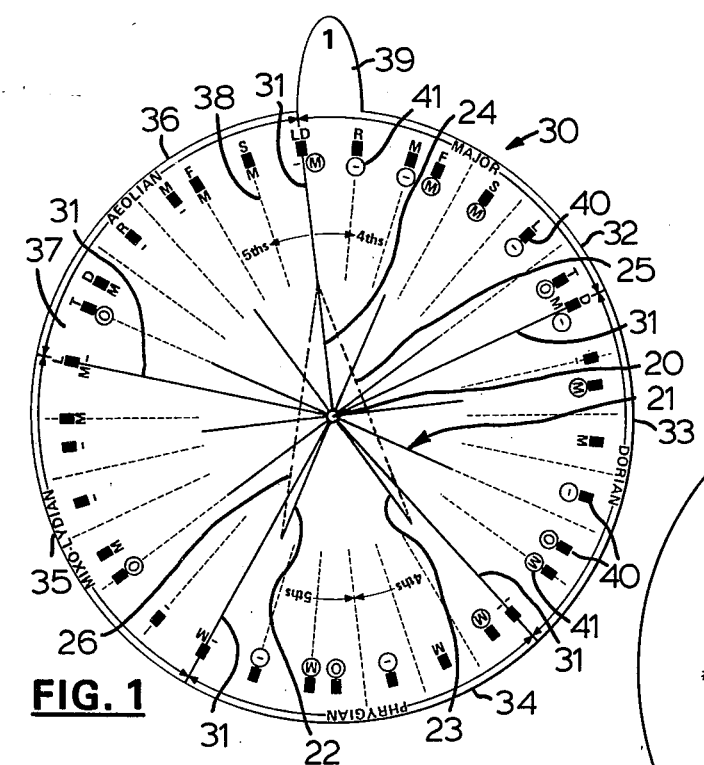
FIG. 1 is a front view of a base disc component of a slide rule according to the invention.

With reference to FIG. 1, there is a first relatively movable display part in the form of a base disc 30 which is divided by bold radial lines 31 into five substantially equal sectors 32, 33, 34, 35 and 36. The sectors represent respectively the modes of music Major, Dorian, Phrygian, Mixolydian and Aeolian as marked. Each sector is divided into six equiangular divisions, e.g. 37 by means of five equally spaced broken radial lines e.g. 38. Each space represents a musical interval of one tone, so that each entire sector represents a musical interval of six tones or one octave. The disc 30 is provided with a peripheral tab 39 to assist in angular movement of it.

The disc 30 is provided around its perimeter with a first series of indicia 40, marked as blocks and adjacent associated notation on the drawing, representing notes of a scale of a given mode of music. Thus the indicia 40 in the sector 32 are angularly spaced according to the sequence of intervals of a scale of major mode of music, and lie either on or midway between the broken lines 38. In the other sectors 33, 34, 35 and 36, the block indicia 40 are arranged corresponding to the characteristic tone-semitone interval sequence of the respective mode of music Dorian, Phrygian, Mixolydian and Aeolian. The block indicia also include a notation of the tonic — soh — fah characteristic of the respective note, by initial letter, i.e. D represents doe R represents ray etc.

The first series of indicia 40 also include further indicia in the form of notations 41, some of which are circled. The notations 41 indicate the type of triad chord which will be based on the respective note of the scale represented by the corresponding block of indicia 40. Thus, when the chord is to be major the symbol $m$ is used. When the chord is to be minor, the symbol — is used. When the chord is to be diminished, the symbol o is used.

The center 20 of disc 30 is apertured to receive a suitable pivotal mounting connection. Extending radially outwardly from the center 20 are fifth indicia 21 in the form of equiangularly spaced radial lines, separated from one another by an angular distance representing 2 and one half tones. There are 11 of these lines in all, a space of 5 tones being left between lines 22 and 23 of the series, i.e. the line opposed to the base line 24 of the series 21 is omitted.

Figure 2:
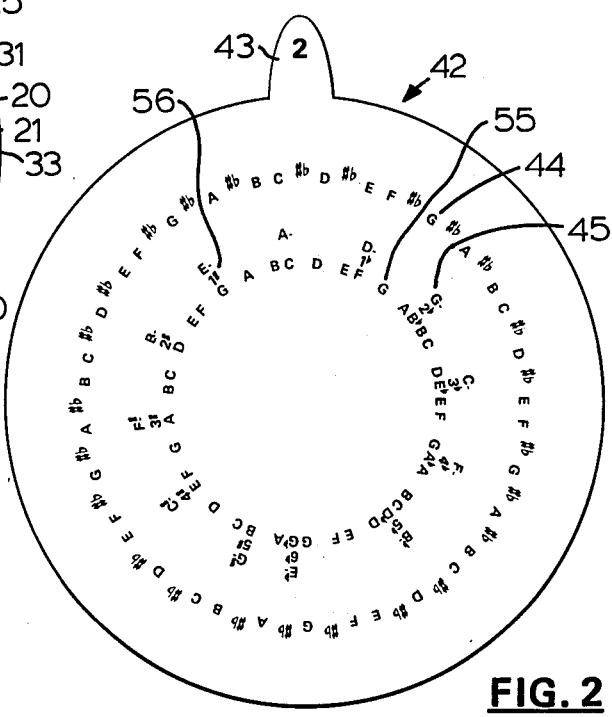
FIG. 2 is a front view of a second disc component for assembly in relatively rotatable fashion with the base disc of FIG. 1.

FIG. 2 illustrates the front view of a second relatively movable display part in the form of a second disc 42 for use in conjunction with the base disc 30 of FIG. 1. The second disc 42 has a peripheral tab 43 to assist in angular movement of it. Disc 42 is transparent and bears a second set of angularly spaced indicia 44, marked with letters corresponding to the notes they represent, in the sequence in which the notes appear on a musical keyboard and spaced apart by an angular interval corresponding to the interval of musical pitch between the notes which they represent. The angular interval representing a semitone on disc 42 and second indicia 44 thereon is the same as that representing a semitone on disc 30 of FIG. 1. Thus when disc 42 is assembled on disc 30 with their centers coinciding, the second indicia 44 fall on or midway between lines 38 of disc 30, and by angular adjustment can be brought into registry with block indicia 40 of disc 30. The set of indicia 44 are arranged to be spaced a short distance inwardly of indicia 40, 41 of disc 30, for ease of reading when the discs are superimposed.

A sixth set of indicia 55 is provided near the center of disc 42, representing notes and corresponding to the second set of indicia 44. These are positioned to register with the ends of lines 21 on disc 30, i.e. the fifth indicia.

Disc 42 has a further set of lettered indicia 45, disposed radially outwardly of the series 55 and registering with individual ones of the series 55. These indicate the related minor scale having the same key signature as the major scale represented by the corresponding indicia of series 55. Thus indicia C of series 55 registers with indicia A of series 45, showing that the C major scale has the same key signature as the A minor scale, namely no sharps or flats. A further series 56 of indicia on disc 42 indicates the respective key signatures of the indicia on series 45 and 55 in registry therewith. Thus it is shown that both the key of G major (series 55) and E minor (series 45) have the key signature of one sharp.

Figure 3:
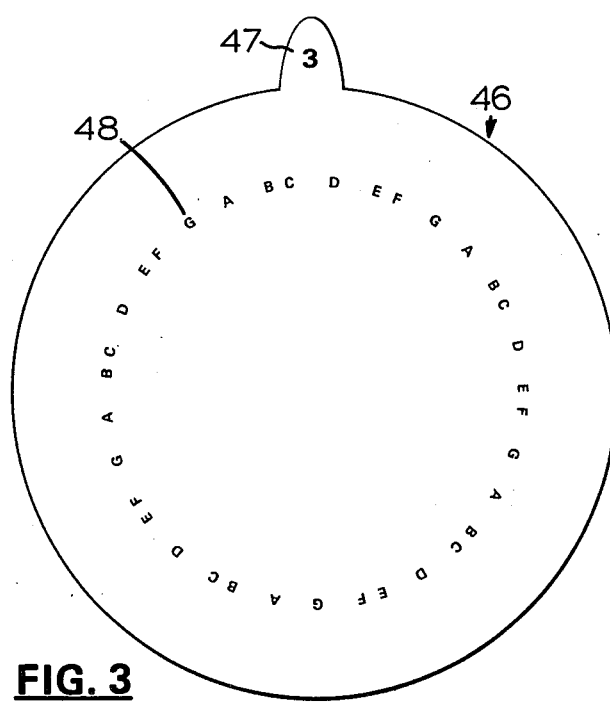
FIG. 3 is a front view of a third disc component for similar assembly with the discs of FIGS. 1 and 2.

FIG. 3 illustrates a third relatively movable display part comprising a third disc 46, having a peripheral tab 47 for assisting in its angular movement, and bearing a third set of lettered indicia 48. The lettered indicia 48 are essentially the same as the second set of lettered indicia 44 appearing on disc 42 of FIG. 2. They represent notes of a keyboard, are spaced apart by an angular distance corresponding to the musical interval between the adjacent notes, and the angular distance between notes of set 48 representing a semitone is the same as the angular distance representing a semitone on discs 42 and 30. The set of indicia 48 on the disc 46 of FIG. 3 is spaced radially inwardly, as compared with the set of indicia 44 on disc 42, so that when the discs 30, 42 and 46 are assembled with their centers coinciding, indicia 48 appear inwardly of indicia 44 for ease of reading. Disc 46 is made of transparent material.

Figure 4:
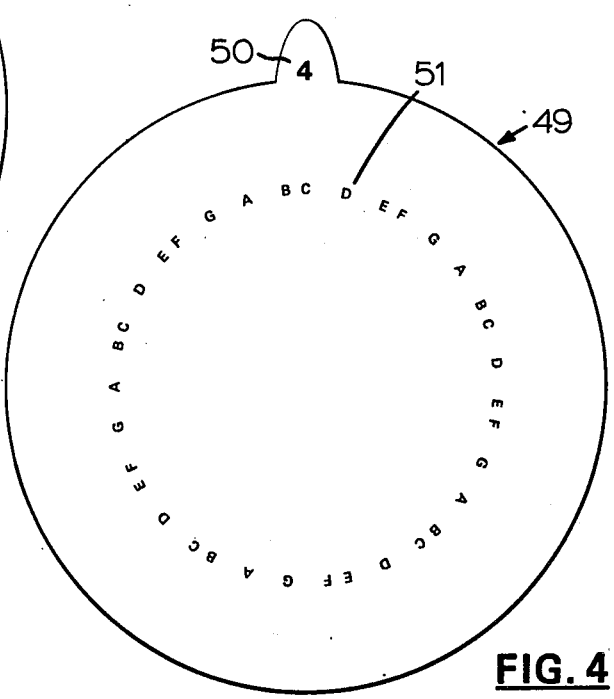
FIG. 4 is a front view of a fourth disc component for similar assembly with the discs of FIGS. 1, 2 and 3.

FIG. 4 is a front view of a fourth relatively movable display part in the form of a fourth disc 49. The disc 49 has a peripheral tab 50 for ease of movement thereof, and bears a fourth set of indicia 51. In essential respects, the disc 49 is the same as disc 46, being made of transparent material, and bearing the set of indicia 51 representing the notes of a keyboard, spaced apart according to the musical interval between adjacent notes, the angular distance representing a semitone on disc 49 being the same as that representing a semitone on discs 46, 42 and 30. Indicia 51 are spaced inwardly with respect to the indicia 48 on disc 46, so that when disc 49 is assembled on top of disc 46 with centers coinciding, the set of indicia 51 is disposed within the set of indicia 48 for ease of reading.

Figure 5:
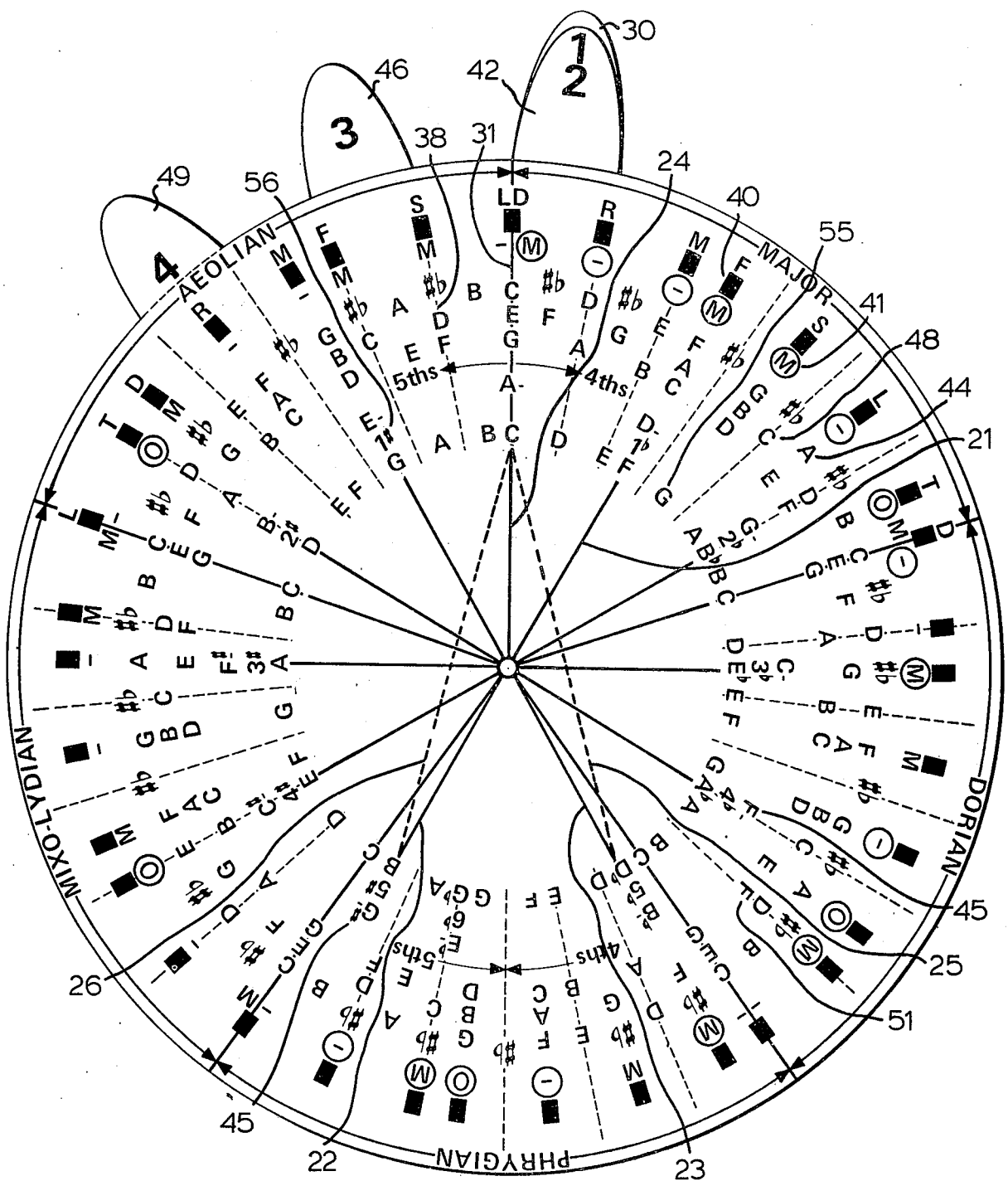
FIG. 5 is a front view of the assembly of the disc components of FIGS. 1, 2, 3 and 4 in super-imposed relationship for working co-operation.

FIG. 5 shows the discs 30, 42, 46 and 49 superimposed in working relationship. They can be operated to determine notes of scales and construct chords. They are pivotally connected at their common center 20.

Thus, considering discs 30 and 42 in the sector representing the major mode of music, it will be seen that if the indicia representing note C on the second set of indicia 44 of disc 42 is set to correspond to the block indicia 40 on the base disc 30 representing the first note of the scale, i.e. bold line 31, the remainder of the note designations D,E,F,G,A, B and C on the indicia 44 register with the remaining block indicia, thereby reading the notes in the major scale of tonic C.

Similarly, in the Dorian mode, in sector 33, the notes comprising the scale of C-Dorian can be read off by the registry of indicia 40 with indicia 44, to be C,D,E flat, F,G,A,B flat. Similar computations can be made for the tonic C scale in the Phrygian,Mixolydian and Aeolian modes, by reading the same registries in sectors 34, 35 and 36 respectively.

If the second disc 42 were to be moved one tone to the left (anti-clockwise) of its position shown in FIG. 5, so that note D registered with the first block indicia of the set 40 of the major mode, the disc would be set to read the notes of the D Major scale, in correspondence with the block indicia 40, namely the notes E,F sharp, G,A, B, C sharp and D. Notes of the tonic D scale cal also be read off for the other modes of music, using indicia 40 and 44 on the first and second discs, respectively, with the discs in this relatively position.

The third indicia 48 and the fourth indicia 51 on the third and fourth discs 46, 49 respectively are used to compute triad chords. Thus in the position of the discs illustrated in FIG. 5, the third disc 46 is placed so that the E indicia on the set 48 is in line with the C indicia on the set 44 of disc 2, and the fourth disc 49 is placed so that the G indicia of the set 51 is in line with the E indicia of the set 48 on the third disc 46. This arrangement therefore puts in line the letters C E G on the discs, the prime chord in the scale of C-major.

In all modes of music and in all scales, there are three primary chords, which are those using as base notes the first, fourth and fifth notes of the scale, and comprising internally a triad of the aforementioned base note, the next but one note of the scale, and the note next but one up the scale from the second note. Thus, in the key of C major, the three primary chords are C E G, F A C and G B D. These are all major chords, since the intervals between adjacent notes have the major characteristics. From these primary chords, derivative secondary chords can be determined. One seconeary chord in C major is the chord E G A, another is B D F, another is A C E, and the fourth one is D F A. The device of the invention as illustrated allows the secondary chords to be computed. These various chords may be major, minor, or diminished. The notations 41 of the indicia 40 indicate whether the triad chord based on the respective note will be major, minor or diminished.

In the position of the various discs shown in FIG. 5, the note C of the second indicia 44 is set to the base line 31, so as to put the device into position for scale of tonic C in all the displayed modes of music. The other discs are aligned so that note E of the third indicia and note G of the fourth indicia are aligned with the base line 31, constructing the major chord CEG of tonic scale C. Proceeding clockwise around the discs, it will be observed that all the other major chords of tonic scale C, in all of the five displayed modes of music, have also been aligned by these indicia and can be read off — FAC (major or Ionian), GBD (major or Ionian), E flat GB flat (Dorian), FAC (Dorian) etc. The composer can thus derive all of the major chords for tonic scale C for consideration for inclusion in a composition, crossing back and fourth between the modes.

Further, the device will give the composer all the minor chords in tonic scale C, by a small angular adjustment of the third disc 46. The third indicia 48 on the third disc 46 effectively represent the middle note of the triad chord. To change from major chords, set out in the position shown in FIG. 5, to minor chords, by definition the middle note must be lowered one semitone, i.e. third disc 46 must be moved clockwise an angular distance equivalent to one semi-tone. By so doing, all of the minor chords of tonic scale C, in all of the presented modes of music, are aligned under the minor notations 41 of first indicia 40, by the indicia 44, 48, 51. These are DFA (major or Ionian mode), EGB(major or Ionian mode), ACE(major or Ionian mode), CE flat G(Dorian), FA flat C(Phrygian) etc. These are now available for the composers selection. In the same manner, all the diminished chords can be obtained by suitably aligning the discs to correspond to the musical intervals of pitch between adjacent notes characteristic of a diminished chord.

The computation of chords can be repeated at will for other tonic scales throughout the presented modes, by adjusting the discs to bring the desired tonic note on indicia 44 into registry with base line 31, and suitable adjustment of the other discs for major, minor etc. chord intervals. It turns out that for any given tonic scale, there are nineteen different chords throughout the five presented modes. The location of these is indicated on the base disc 30 by a further series of indicia namely circling the respective notations 41 of the indicia 40. Chords falling under a non-circled notation 41 are duplicates of those falling under the circled notations. By inclusion of the identification of the 19 chords the range of selection of chords available to the composer is clearly presented, and a further indication of the relationship between the various modes of music is given.

The sixth series of indicia 55 on the second disc 42 register with the fifth set of indicia 21 on the base disc 30. This registry gives information concerning triad chord progressions in the major mode of music. The notes indicated by registry of indicia 21 with indicia 55, and hence chords (major, minor or diminished) based on these notes, progress, in the clockwise direction by 4th intervals, and in the anti-clockwise direction by 5th intervals. Thus, in the alignment shown in FIG. 5, the interval C to F is a fourth, F to B flat is a fourth, etc, and the interval C to G is a fifth, G to D is a fifth etc. This registration of indicia also gives the student or composer valuable information about chord progressions. When working in the key of C major, as the discs are aligned in FIG. 5, these alignments indicate that, in a musical composition, the chord of one base indicated by the alignment can naturally and harmonically be followed by the chord indicated by the adjacent alignment, i.e. the E chord can be naturally followed by the A chord or the B chord. The indicia 21 also include broken lines 25, 26 indicating possible chord resolution and progression back to the prime chord based on the tonic note of the scale. Thus in the FIG. 5 alignment, the chord of B may be acceptably followed by the tonic chord of C.

The alignment also indicates that a chord may be followed by the chord represented by the registration at the radially opposite end of a line of indicia 21. Thus in the alignment of FIG. 5, i.e. C major, it is indicated that the triad chord B can be followed by chord F. The composer is thus presented with the various commonly accepted chord progressions, for returning in the composition from one chord to the base chord of the scale, in commonly accepted manner. From the chord of E, for example, when playing in the C major scale shown in FIG. 5, the music may return to the tonic — C chord via the A, D and G chord sequence, or via the B — chord or via the B flat and F sequence. These are the chord progressions commonly found and accepted in Western music. The device according to the invention graphically illustrates this, and teaches familiarity with it. By suitable alignment of the indicia 21 and 55, these chord progressions for any major diatonic scale may be illustrated and computed. In addition, the opposite ends of the radial lines of series 21 join together two dominant seventh chords sharing the same tritone, which is significant in understanding musical structures and making musical compositions.

The primary chords of a given major tonic scale are presented by coincidence of indicia 21 and 55. The prime chord based on the tonic note is presented at the base line 31 coincidence. The other two primary chords, based on the fourth and fifth notes of the scale, are presented by the coincidences of series 21 and 55 immediately adjacent to, and on either side of, the base line 31, no matter which tonic scale is set to the base line 31.

I claim:

1. A music teaching and computation device comprising:
- a first relatively movable display part divided into at least four sectors, each sector representing a given, different mode of music selected from the group of modes consisting of major (Ionian), Dorian, Phyrygian, Mixolydian and Aeolian modes, and each sector bearing a first series of indicia representing the notes of diatonic scales of the mode of music represented thereon;
- the indicia of the first series being spaced from one another a first distance representative of a musical interval of pitch of a tone or a second distance substantially half the first distance, and representative of a musical interval of pitch of a semitone, the sequence of first distances and second distances between adjacent notes corresponding to the tone — semi-tone sequence characteristic of the mode of music represented thereby;
- a second relatively movable display part bearing a second series of indicia representing in sequence the notes of a musical keyboard, the distances between adjacent indicia of the second series being proportional to the musical interval of pitch between the notes represented by the respective indicia, the distance representing a musical interval of one tone in the second series of indicia being substantially the same as the distance representing a musical interval of one tone in the first series of indicia;
- the first and second relatively movable display parts being angularly movable with respect to one another about a common pivot to allow the first and second series of indicia to be moved into registry with one another;
- the first display part also including fifth indicia comprising a series of equiangularly spaced notations, separated by an angular distance representing two and one half tones, and the second display part including sixth indicia for registration with the fifth indicia, the sixth indicia representing notes of a musical keyboard and separated from one another by an angular distance representing the appropriate musical interval of a tone or a semi-tone, the progression of notes according to fourth intervals and fifth intervals being denoted by the coincidences of the fifth indicia and the sixth indicia, in the appropriate mode of music.

2. The device of claim 1 in the form of a generally circular slide rule, the first and second relatively movable display parts comprising discs pivotally secured together at a common center, the spacings between indicia of said first series and said second series being angular spacings.

3. The device of claim 2 wherein the first display part has five sectors, representing respectively the major (Ionian), Dorian, Phrygian, Mixolydian and Aeolian modes of music.

4. The device of claim 2, also including third and fourth relatively movable display parts, the third display part and the fourth display part bearing respectively third and fourth series of indicia, both the third and fourth series of indicia representing in sequence the notes of a musical keyboard, the distances between adjacent indicia of the respective third and fourth series being proportional to the musical interval of pitch between the notes represented by the respective indicia of the series, the distance representing a musical interval of one tone in the third and fourth series of indicia being substantially the same as the distance representing a musical interval of one tone in the first series of indicia, said third and fourth display parts each comprising generally circular discs pivotally secured to said first and second display parts at the common center.

5. The device of claim 2 wherein the first relatively movable display part also includes an eighth series of indicia, individual ones of said eighth series being associated with respective, selected ones of said first series of indicia to indicate that the triad cords based upon the notes represented by the respective selected ones of the first indicia are among the 19 possible cords distributed through the five presented modes of music which can fit harmonically and melodically within the scheme of music of the given diatonic scale.

* * * * *